(12) United States Patent
Lin

(10) Patent No.: US 10,492,248 B2
(45) Date of Patent: Nov. 26, 2019

(54) SYSTEM AND METHOD FOR ADJUSTING POWER OF INVERTER OF MICROWAVE OVEN, AND MICROWAVE OVEN

(71) Applicant: Midea Group Co., Ltd., Beijiao, Shunde, Foshan (CN)

(72) Inventor: Yue-Yue Lin, Foshan (CN)

(73) Assignee: MIDEA GROUP CO., LTD., Beijiao, Shunde, Foshan (CN)

( * ) Notice: Subject to any disclaimer, the term of this patent is extended or adjusted under 35 U.S.C. 154(b) by 959 days.

(21) Appl. No.: 14/972,910

(22) Filed: Dec. 17, 2015

(65) Prior Publication Data

US 2016/0183331 A1 Jun. 23, 2016

(30) Foreign Application Priority Data

Dec. 17, 2014 (CN) .......................... 2014 1 0798131

(51) Int. Cl.
*H05B 6/68* (2006.01)
*H05B 6/64* (2006.01)
*H02M 3/337* (2006.01)

(52) U.S. Cl.
CPC ............ *H05B 6/681* (2013.01); *Y02B 40/143* (2013.01)

(58) Field of Classification Search
CPC ............................. H05B 6/681; Y02B 40/143

USPC ............... 219/715, 718, 721, 716, 723, 760; 363/19, 25, 55, 97, 98, 133, 134, 180

See application file for complete search history.

(56) References Cited

U.S. PATENT DOCUMENTS 5,286,938 A * 2/1994 Takei ...................... H05B 6/683
219/715
2006/0289509 A1* 12/2006 Miyazaki ............ H02M 1/4208
219/716

* cited by examiner

*Primary Examiner* — Quang T Van
(74) *Attorney, Agent, or Firm* — Middle Reutlinger (57) ABSTRACT

A system and a method for adjusting a power of an inverter of a microwave oven, and a microwave oven are provided. The system (100) includes: a storage module (101), configured to store an index table comprising periodic counting values and identification numbers; a control module (102), configured to look up an identification number corresponding to a power request signal in the index table according to the power request signal, to look up a periodic counting value corresponding to the identification number in the index table, and to output a frequency signal according to the periodic counting value; and a communication module (104), configured to output a power control signal to the inverter (106) of the microwave oven according to the frequency signal. The inverter (106) outputs a power to a magnetron (108) of the microwave oven according to the power control signal.

19 Claims, 3 Drawing Sheets

SYSTEM AND METHOD FOR ADJUSTING POWER OF INVERTER OF MICROWAVE OVEN, AND MICROWAVE OVEN

CROSS-REFERENCE TO RELATED APPLICATION

This application claims priority to and benefits of Chinese Patent Application Serial No. 201410798131.9, filed with the State Intellectual Property Office of P. R. China on Dec. 17, 2014, the entire content of which is incorporated herein by reference.

FIELD

The present disclosure relates to a microwave oven, and more particularly to a system and a method for adjusting a power of an inverter of a microwave oven, and a microwave oven.

BACKGROUND

At present, compared with the transformer power source, the inverter of the microwave oven draws much attention of customers because of its advantages of lightweight, high power factor and continuously adjustable power. However, the inverter consists of numbers of electronic elements, and electronic parameters of each electronic element have errors, such that for the same input different inverters may output powers that greatly deviate from the actual value.

Because of such property, when producing a microwave oven with frequency conversion function on the production line, it needs to adjust the full power ($P_{100}$) of the microwave oven, such that the user may use the microwave oven with a normal power. However, the microwave oven also has other power magnitudes, such as $P_{90}$ (90% of the full power), $P_{80}$ (80% of the full power), $P_{70}$ (70% of the full power), $P_{60}$ (60% of the full power), $P_{50}$ (50% of the full power). It is significantly important to adjust these power magnitudes to normal ranges, while $P_{100}$ is adjusted to a normal power.

The conventional solution for above problem is that, by using a computer board controller, a coefficient weighted correction is applied to a level to be adjusted based on the reference power so as to form a final power, thus adjusting the difference of the power. However, since the relationships between different powers are nonlinear, it is difficult to determine the weighted correction coefficient. Moreover, such solution may cause the power magnitudes outputted by different inverters exceeding the normal fluctuation range of the power.

SUMMARY

Embodiments of the present disclosure seek to solve at least one of the problems existing in the related art to at least some extent.

According to a first aspect of the present disclosure, a system for adjusting a power of an inverter of a microwave oven is provided. The system includes: a storage module, configured to store an index table comprising periodic counting values and identification numbers; a control module, configured to look up an identification number corresponding to a power request signal in the index table according to the power request signal, to look up a periodic counting value corresponding to the identification number in the index table, and to output a frequency signal according to the periodic counting value; and a communication module, configured to output a power control signal to the inverter of the microwave oven according to the frequency signal. The inverter of the microwave oven outputs a power to a magnetron of the microwave oven according to the power control signal.

With the system for adjusting the power of the inverter of the microwave oven, the control module obtains the periodic counting value corresponding to the power request signal by looking up in the index table comprising periodic counting values and identification numbers, and controls the power outputted by the inverter according to the periodic counting value. By this means, a conventional coefficient weighted correction method is avoided, and the periodic counting value is looked up in the index table, such that the power outputted by the inverter fluctuates in a normal range, and the magnetron may work normally, thus ensuring a lifetime of the magnetron.

In one embodiment, the control module is a PWM control module.

In one embodiment, the communication module includes: a transistor, having an emitter connected with a DC power source; a first resistor, having one terminal connected with an input/output port of the communication module and the other terminal connected with a base of the transistor; a second resistor, having one terminal connected with the other terminal of the first resistor and the base of the transistor and the other terminal connected with the emitter of the transistor and the DC power source; a third resistor, having one terminal connected with a collector of the transistor and the other terminal connected with a power source port of the invertor; and a fourth resistor, having one terminal connected with the other terminal of the third resistor and the power source port of the inverter and the other terminal grounded.

In one embodiment, the index table includes a plurality of identification numbers and a plurality of periodic counting values, there is a one-to-one relationship between the plurality of periodic counting values and the plurality of identification numbers, and the plurality of identification numbers form an arithmetic progression.

In one embodiment, identification numbers corresponding to theoretic periodic counting values are ranged between a first identification number and a last identification number of the plurality of identification numbers.

According to a second aspect of the present disclosure, a method for adjusting a power of an inverter of a microwave oven is provided. The method includes: looking up an identification number corresponding to a power request signal in a pre-stored index table according to the power request signal, the index table comprising periodic counting values and identification numbers; looking up a periodic counting value corresponding to the identification number in the index table; outputting a frequency signal according to the periodic counting value; outputting a power control signal to the inverter of the microwave oven according to the frequency signal; and outputting a power by the inverter of the microwave to a magnetron of the microwave oven according to the power control signal.

With the method for adjusting the power of the inverter of the microwave oven, by looking up in the index table comprising periodic counting values and identification numbers to obtain the periodic counting value corresponding to the power request signal, and controlling the power outputted by the inverter according to the periodic counting value, a conventional coefficient weighted correction method is avoided. Moreover, the periodic counting value is looked up in the index table, such that the power outputted by the inverter fluctuates in a normal range, and the magnetron may work normally, thus ensuring a lifetime of the magnetron.

In one embodiment, the index table includes a plurality of identification numbers and a plurality of periodic counting values, there is a one-to-one relationship between the plurality of periodic counting values and the plurality of identification numbers, and the plurality of identification numbers form an arithmetic progression.

In one embodiment, identification numbers corresponding to theoretic periodic counting values are ranged between a first identification number and a last identification number of the plurality of identification numbers.

According to a third aspect of the present disclosure, a microwave oven is provided. The microwave oven includes: a storage module, configured to store an index table comprising periodic counting values and identification numbers; a control module, configured to look up an identification number corresponding to a power request signal in the index table according to the power request signal, to look up a periodic counting value corresponding to the identification number in the index table, and to output a frequency signal according to the periodic counting value; and a communication module, configured to output a power control signal according to the frequency signal; an inverter, configured to output a power to a magnetron according to the power control signal; and the magnetron, configured to work with the power outputted by the inverter.

With the microwave oven, the control module obtains the periodic counting value corresponding to the power request signal by looking up in the index table comprising periodic counting values and identification numbers, and controls the power outputted by the inverter according to the periodic counting value. By this means, a conventional coefficient weighted correction method is avoided, and the periodic counting value is looked up in the index table, such that the power outputted by the inverter fluctuates in a normal range, and the magnetron may work normally, thus ensuring a lifetime of the magnetron.

The above summary of the present disclosure is not intended to describe each disclosed embodiment or every implementation of the present disclosure. The Figures and the detailed description which follow more particularly exemplify illustrative embodiments.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

Figure 1:
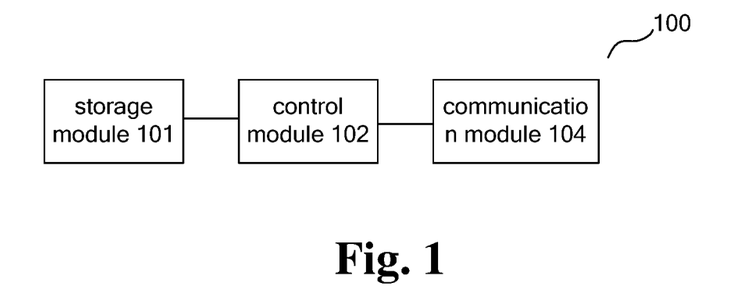
FIG. 1 is a block diagram of a system for adjusting a power of an inverter of a microwave oven according to an embodiment of the present disclosure.

Referring to FIG. 1, a system for adjusting a power of an inverter of a microwave oven is provided according to an embodiment of the present disclosure. The system 100 includes: a storage module 101, a control module 102 and a communication module 104.

The storage module 101 is configured to store an index table comprising periodic counting values and identification numbers (referring to Table. 4).

The control module 102 is configured to look up an identification number corresponding to a power request signal in the index table according to the power request signal, to look up a periodic counting value corresponding to the identification number in the index table, and to output a frequency signal according to the periodic counting value.

The communication module 104 is configured to output a power control signal to the inverter of the microwave oven according to the frequency signal. The inverter of the microwave oven outputs a power to a magnetron of the microwave oven according to the power control signal. The magnetron works with the power outputted by the inverter. In this embodiment, with reference to FIG. 2, the communication module 104 may include a transistor Q1, a resistor R1, a resistor R2, a resistor R3 and a resistor R4.

Figure 2:
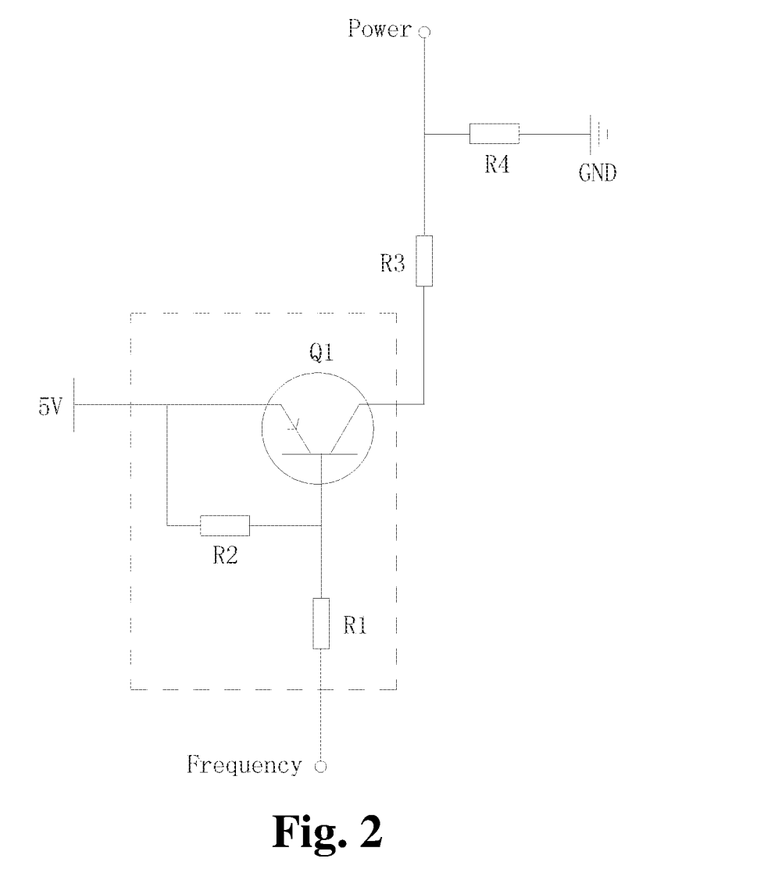
FIG. 2 is a circuit diagram of a communication module according to an embodiment of the present disclosure.

The resistor R1 has one terminal connected with an input/output port of the communication module 102 and the other terminal connected with a base of the transistor Q1. The resistor R2 has one terminal connected with the other terminal of the resistor R1 and the base of the transistor Q1 and the other terminal connected with the emitter of the transistor Q1 and a DC power source (e.g., 5V). The transistor Q1 has an emitter connected with the DC power source and a collector connected with one terminal of the resistor R3. The other terminal of the resistor R3 is connected with a power source port of an inverter. The resistor R4 has one terminal connected with the other terminal of the resistor R3 and the power source port of the inverter and the other terminal grounded.

Figure 3:
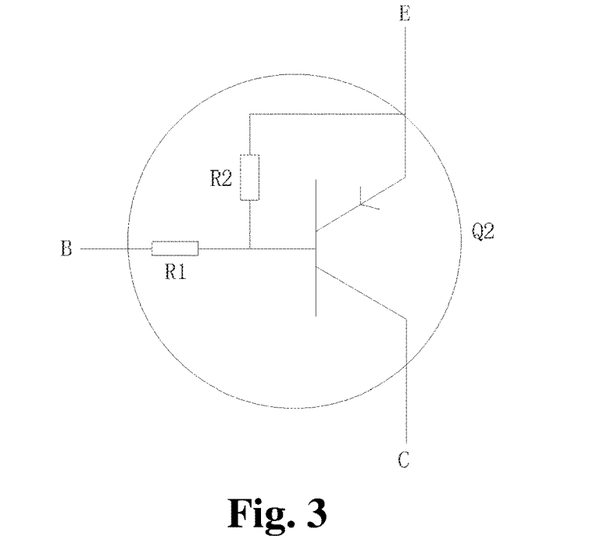
FIG. 3 is a circuit diagram of a digital transistor according to an embodiment of the present disclosure.

The transistor may be a PNP transistor. The resistor R1 may be a current limiting resistor, the resistor R2 may be a pull-up resistor, and the resistor R3 and the resistor R4 each may be a divider resistor. The transistor Q1, the resistor R1 and the resistor R2 may be replaced by a digital transistor Q2 shown in FIG. 3.

A function of the transistor Q1 may be illustrated as follows. The input/output port (i.e., IO port) of the communication module 102 is named as Frequency, representing a frequency F outputted by the communication module 102. The frequency F is outputted to the power source port (i.e., Power port) of the inverter through an isolation of the transistor Q1, representing the power P to be outputted by the inverter. A communicating regulation of the communication module 104 is that, if the control module 102 outputs 1 Hz frequency signal, it means that the inverter will output 1 W power. It should be understood that, in other embodiments, a relationship between the frequency signal and the power outputted may be adjusted according to practice or different requirements, which is not limited herein.

In this embodiment, the control module 102 may be a computer board control chip, such as a pulse width modulation (PWM) control module. The PWM control module is configured to generate PWM wave forms with adjustable period and duty ratio. A principle of the PWM control module is dividing frequency for a reference oscillating source having a fixed frequency $F_{osc}$ to generate wave forms with adjustable frequencies. The oscillating source may be an RC oscillating circuit, a crystal oscillator or a ceramic resonator. Considering that an error of the RC resonance oscillation is relatively greater, which may cause a relatively greater power deviation, the crystal oscillator or the ceramic resonator is preferred.

The computer board control chip may output a PWM wave form with a corresponding frequency via a register. Currently, the chip cannot assign a frequency of the wave form to the register, but gives a multiple N of a period of the wave form with respect to a reference oscillating period to the register, where N is a periodic counting value.

There is a formula $1/F_{osc}*N=1/F$ according to a relationship between the frequency $F_{osc}$ of the reference oscillating source and a target wave form frequency F. N represents that a new period signal is obtained by superimposing N periods of the reference oscillating source, i.e., a new period is N times of the period of reference oscillating source. Thus, $N=F_{osc}/F$. If $F_{osc}$ is a fixed value, N is inversely proportional to F, and there is a nonlinear relationship between N and F. In this case, it is difficult to correct the power via a coefficient weighted method, which may be illustrated in detail with reference to following example.

It is supposed that $F_{osc}$ is 1 MHz, and $P_{100}$ is set as 1400 W. Considering a loss for an actual output, $P_{90}$ is set as 1280 W, $P_{90}$ is set as 1160 W, $P_{70}$ is set as 1040 W, $P_{60}$ is set as 920 W, and $P_{50}$ is set as 760 W. In theory, output frequencies of the control module may be obtained according to the communicating regulation described above, that is, $F_{100}$=1400 Hz, $F_{90}$=1280 Hz, $F_{80}$=1160 Hz, $F_{70}$=1040 Hz, $F_{60}$=920 Hz, $F_{50}$=760 Hz. $P_{100}$, $P_{90}$, $P_{80}$, $P_{70}$, $P_{60}$ and $P_{50}$ represent a power request outputted by the inverter, respectively. The power request may be understood as a "power magnitude". In other words, in this embodiment, there are 6 power requests for the power outputted by the inverter.

It should be noted that, the number and the value of the power request may be adjusted according to practice or different requirements, which are not limited herein.

Respective periodic counting values N may be calculated as $N_{100}$=714, $N_{90}$=781, $N_{80}$=862, $N_{70}$=961, $N_{60}$=1086, $N_{50}$=1315, according to the formula $N=F_{osc}/F$, referring to Table 1, where an integer part of the value of N is taken.

TABLE 1

| Power magnitude | $P_{100}$ | $P_{90}$ | $P_{80}$ | $P_{70}$ | $P_{60}$ | $P_{50}$ |
|---|---|---|---|---|---|---|
| Setting output power (W) | 1400 | 1280 | 1160 | 1040 | 920 | 760 |
| Theoretical output frequency $F_j$ (Hz) | 1400 | 1280 | 1160 | 1040 | 920 | 760 |
| Theoretical periodic counting value $N_j$ ($N_j = F_{osc}/F_j$) | 714 | 781 | 862 | 961 | 1086 | 1315 |

However, there is a deviation between an actual output power and a theoretical output power caused by electronic elements of the inverter. Provided that there are Case 1 (positive deviation) and Case 2 (negative deviation), refer to Table 2 and Table 3, where i is 1 or 2, and j is 100, 90, 80, 70, 60 or 50 (representing different power magnitudes).

$F_j$: theoretical output frequency under power magnitude $P_j$ $N_j$: theoretical periodic counting value under power magnitude $P_j$ $F_{i,j}$: actual output frequency under power magnitude $P_j$ in Case i $N_{i,j}$: actual periodic counting value under power magnitude $P_j$ in Case i $M_{i,j}$: periodic corrected value for each power magnitude level to be adjusted in Case i S: the number of levels to be adjusted for adjusting $P_{100}$ to an actual power.

A period adjusting value for each level is $A+M_{i,j}$, where A is a fixed value representing a variation of the periodic counting value of two adjacent levels.

Because $P_{100}$ is used for adjusting the power, $M_{i,100}$=0, that is, the periodic corrected value for $P_{100}$ is 0. Thus the number S of levels to be adjusted corresponding to $P_{100}$ may be obtained. The numbers S of levels to be adjusted corresponding to $P_{90}$ to $P_{50}$ should be consistent with the number S of levels to be adjusted corresponding to $P_{100}$.

According to the variation above, a final adjusting formula for the actual periodic counting value is $N_{i,j}=N_j+S*(A+M_{i,j})$, that is, actual periodic counting value=theoretical periodic counting value+the number of levels to be adjusted*(A+periodic corrected value). Thus the periodic corrected value may be calculated as $M_{i,j}=(N_{i,j}-N_j)/S-A$. Because $M_{i,100}$ is 0, it can be obtained that $S=(N_{i,100}-N_{100})/A$.

In the following tables, A is set as 10, $F_{i,j}$ is an actual measurement value, $N_{i,j}$ may be calculated according to the formula $N=F_{osc}/F$ and $F_{i,j}$, and the number S of levels to be adjusted may be calculated according to $S=(N_{i,100}-N_{100})/A$.

According to Table 2, in the case of positive deviation, $N_{1,100}=F_{osc}/F_{1,100}=1$ MHz/1500=666, $S=(N_{1,100}-N_{100})/A=(666-714)/10=-4.8$, the number S of levels may be taken as $-5$.

Then, the periodic corrected value $M_{i,j}$ for each adjusted power magnitude may be calculated according to the formula $M_{i,j}=(N_{i,j}-N_j)/S-A$, referring to Table 2. Similarly, the periodic corrected value $M_{i,j}$ for each adjusted power magnitude in the case of negative deviation may be calculated, referring to Table 3.

TABLE 2 positive deviation, i.e., upper deviation
(taking 100 Hz upper deviation for example)

| Power magnitude | $P_{100}$ | $P_{90}$ | $P_{80}$ | $P_{70}$ | $P_{60}$ | $P_{50}$ |
|---|---|---|---|---|---|---|
| Power (W) | 1400 | 1280 | 1160 | 1040 | 920 | 760 |
| Frequency $F_{1,j}$ (Hz) in Case 1 | 1500 | 1380 | 1260 | 1140 | 1020 | 860 |
| Periodic counting value $N_{1,j}$ in Case 1 | 666 | 724 | 793 | 877 | 980 | 1162 |
| Number S of levels to be adjusted | −5 | −5 | −5 | −5 | −5 | −5 |
| Theoretical periodic counting value $N_j$ | 714 | 781 | 862 | 961 | 1086 | 1315 |
| Periodic corrected value $M_{1,j}$ | 0 | 1 | 3 | 6 | 11 | 20 |

TABLE 3 negative deviation, i.e., lower deviation
(taking 100 Hz lower deviation for example)

| Power magnitude | $P_{100}$ | $P_{90}$ | $P_{80}$ | $P_{70}$ | $P_{60}$ | $P_{50}$ |
|---|---|---|---|---|---|---|
| Power (W) | 1400 | 1280 | 1160 | 1040 | 920 | 760 |
| Frequency $F_{2,j}$ (Hz) in Case 2 | 1300 | 1180 | 1060 | 940 | 820 | 660 |
| Periodic counting value $N_{2,j}$ in Case 2 | 769 | 847 | 943 | 1063 | 1219 | 1515 |
| Number S of levels to be adjusted | 5 | 5 | 5 | 5 | 5 | 5 |
| Theoretical periodic counting value $N_j$ | 714 | 781 | 862 | 961 | 1086 | 1315 |
| Periodic corrected value $M_{2,j}$ | 0 | 3 | 6 | 10 | 16 | 30 |

It may be seen from Table 2 and Table 3, the periodic corrected value $M_{1,j}$ is different from the periodic corrected value $M_{2,j}$, which means that the periodic corrected value is different in the case of positive deviation and in the case of negative deviation. In order to reduce the error, an average of $M_{1,j}$ and $M_{2,j}$ is taken usually. Taking 760 W for example, the average of $M_{1,j}$ and $M_{2,j}$ is 25, the deviation is 5 with respect to the periodic corrected value 20 in Case 1, and thus the deviation of the actual periodic counting value $N_{i,j}$ is S*5, i.e., 25. That is, the number of levels to be adjusted for adjusting 1400 W to 76 W is 5, and each level deviates 5. Therefore, the error is relatively larger.

In this embodiment, the storage module 101 stores the index table comprising periodic counting values and identification numbers, the control module 102 obtains the periodic counting value corresponding to the power request signal by looking up in the index table comprising periodic counting values and identification numbers, and controls the power outputted by the inverter according to the periodic counting value. By this means, the conventional coefficient weighted correction method is avoided. The index table may be established with reference to following example. In one embodiment, the index table includes a plurality of identification numbers and a plurality of periodic counting values, there is a one-to-one relationship between the plurality of periodic counting values and the plurality of identification numbers, and the plurality of identification numbers form an arithmetic progression. Identification numbers corresponding to theoretic periodic counting values are ranged between a first identification number and a last identification number of the plurality of identification numbers.

Firstly, a certain frequency range is determined A maximum value in the frequency range is greater than a theoretic frequency value corresponding to $P_{100}$, and a minimum value in the frequency range is less than a theoretic frequency value corresponding to $P_{50}$, for example, the frequency range is 1700 Hz~500 Hz with an interval such as 20 Hz. The periodic counting value corresponding to the each frequency is stored in an "Array X [ ]", and sequence numbers of theoretic periodic counting values of $P_{100}$~$P_{50}$ in the "Array X [ ]" are stored in an "Array Y [ ]".

TABLE 4 index table comprising periodic counting
values and identification numbers

| Frequency Hz | Array X (periodic counting value) | sequence numbers of theoretic periodic counting values of $P_{100}$~$P_{50}$ in "Array X [ ]": 0, 1, 2, 3, 4 ... |
|---|---|---|
| 1700 | 588 | 0 |
| ... | ... | ... |
| 1400 | 714 | 15 (sequence number of theoretic periodic counting value of $P_{100}$ in Array X) |
| ... | ... | ... |
| 1280 | 781 | 21 (sequence number of theoretic periodic counting value of $P_{90}$ in Array X) |
| ... | ... | ... |
| 1160 | 862 | 27 (sequence number of theoretic periodic counting value of $P_{80}$ in Array X) |
| ... | ... | ... |
| 1040 | 962 | 34 (sequence number of theoretic periodic counting value of $P_{70}$ in Array X) |
| ... | ... | ... |
| 920 | 1087 | 39 (sequence number of theoretic periodic counting value of $P_{60}$ in Array X) |
| ... | ... | ... |
| 760 | 1316 | 47 (sequence number of theoretic periodic counting value of $P_{50}$ in Array X) |
| ... | ... | ... |
| 500 | 2000 | 60 |

That is, X[ ]={588, ..., 714, ..., 781, ..., 862, ..., 962, ..., 1087, ..., 1316, ..., 2000}, Y[ ]={15, 21, 27, 34, 39, 47}.

It can be seen that sequence numbers of theoretic periodic counting values of $P_{100}$~$P_{50}$ in the "Array X [ ]" are 15, 21, 27, 34, 39 and 47, which are all ranged between a first sequence number 0 and a last sequence number 60, thus ensuring each power magnitude may correspond to a periodic counting value.

Moreover, in this embodiment, the identification numbers are the sequence numbers 0, 1, 2, 3, 4, ..., 60. It may be understood that, in other embodiments, the identification numbers may be arranged or represented in other form, so long as there is a one-to-one relationship between the plurality of periodic counting values and the plurality of identification numbers. Therefore, the numbers shown in above example are not understood as a limit to the present disclosure.

Thus while adjusting the power, the sequence number is changed according to the data in the two arrays shown in Table 4 (i.e., the sequence numbers (identification numbers) and the periodic counting values)) and the numbers S of levels to be adjusted (S is the number of levels to be adjusted for adjusting $P_{100}$ to the actual power, i.e., $S=(N_{i,100}-N_{100})/10$), that is, the actual periodic counting value $N_{i,j}$=X[Y[K]+S], where K=0~5, representing the number of the power magnitude request. K=0 corresponds to $P_{100}$, K=1 corresponds to $P_{90}$, K=2 corresponds to $P_{80}$, K=3 corresponds to $P_{70}$, K=4 corresponds to $P_{60}$, and K=5 corresponds to $P_{50}$.

An example will be taken as follows.

In the case of negative deviation, the number S of levels to be adjusted is 5 for adjusting $P_{100}$ to the actual power.

Thus, $N_{i,100}$=X[Y [0]+5]=X[15+5]=X[20], representing that the sequence number of the actual periodic counting value corresponding to $P_{100}$ in the index is 20.

Thus, $N_{i,90}$=X[Y [1]+5]=X[21+5]=X[26], representing that the sequence number of the actual periodic counting value corresponding to $P_{90}$ in the index is 26.

. . .

Thus, $N_{i,50}$=X[Y [5]+5]=X[47+5]=X[52], representing that the sequence number of the actual periodic counting value corresponding to $P_{50}$ in the index is 52.

The control module 102 looks up the actual periodic counting values corresponding to the sequence numbers in the index table, the actual periodic counting values corresponding to all power magnitudes $P_{100}$~$P_{50}$ may be calculated.

The case of positive deviation is similar to the case of negative deviation, except that the number S of levels to be adjusted is −5, and thus it will not be illustrated in detail herein.

It can be seen that, with the system for adjusting the power of the inverter of the microwave oven, it is not required to correct the periodic counting value, and thus the error caused by the conventional coefficient weighted correction method is avoided. By changing the sequence number in the array, the data in the array is shifted as a whole, thus completing the setting of the actual periodic counting values of $P_{100}$~$P_{50}$. Once these actual periodic counting values N are set, the control module 102 may output the actual frequencies corresponding to $P_{100}$~$P_{50}$, and it ensures that $P_{90}$~$P_{50}$ are in a normal range if $P_{100}$ is adjusted to a normal power. Further, the deviation of the power is restricted in a relatively smaller range.

When the system 100 is applied to the microwave oven, a kind of deviation (i.e., the positive deviation or the negative deviation) is set in the system 100 according to a fabrication condition of the microwave oven. During a practical use, a user may choose a desired power magnitude with a power option element (such as a knob, a button or a touch pad) on the microwave oven, thus generating a corresponding power request signal. The control module 102 looks up the corresponding actual periodic counting value in the index table according to the power request signal, and outputs a frequency signal corresponding to the actual periodic counting value to the communication module 104. The communication module 104 outputs a power control signal to the inverter of the microwave oven according to the frequency signal, and the inverter of the microwave oven outputs a power to a magnetron of the microwave oven according to the power control signal. Thus, the magnetron may work with the power magnitude chosen by the user.

With the system for adjusting the power of the inverter of the microwave oven, the control module obtains the periodic counting value corresponding to the power request signal by looking up in the index table comprising periodic counting values and identification numbers, and controls the power outputted by the inverter according to the periodic counting value. By this means, a conventional coefficient weighted correction method is avoided, and the periodic counting value is looked up in the index table, such that the power outputted by the inverter fluctuates in a normal range, and the magnetron may work normally, thus ensuring a lifetime of the magnetron.

Figure 4:
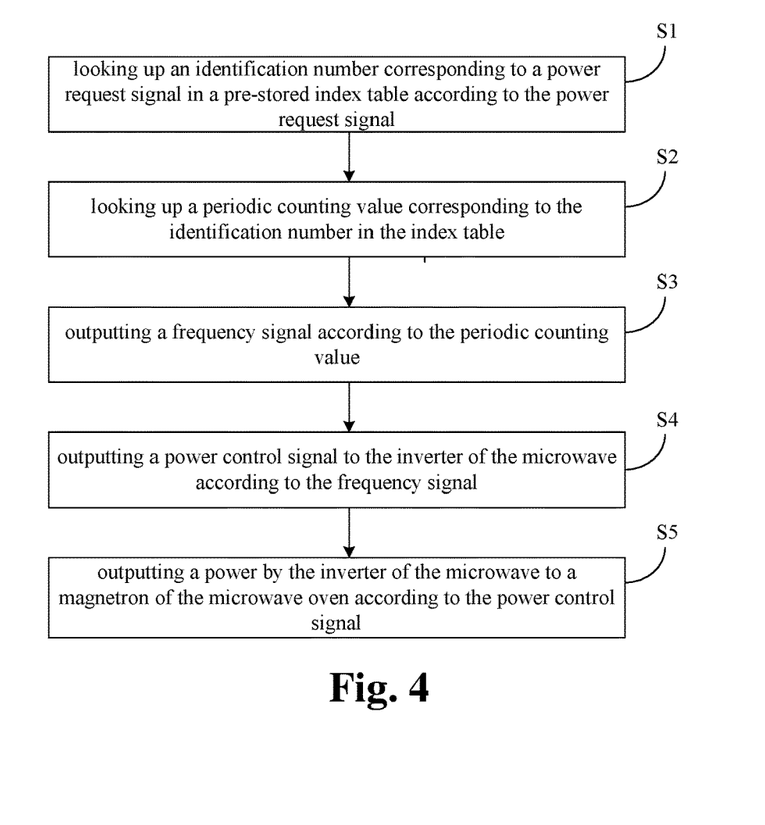
FIG. 4 is a flow chart of a method for adjusting a power of an inverter of a microwave oven according to an embodiment of the present disclosure.

Referring to FIG. 4, a method for adjusting a power of an inverter of a microwave oven is provided according to an embodiment of the present disclosure. The method includes following steps.

In step S1, an identification number corresponding to a power request signal is looked up in a pre-stored index table according to the power request signal, the index table including periodic counting values and identification numbers.

In step S2, a periodic counting value corresponding to the identification number is looked up in the index table.

In step S3, a frequency signal is outputted according to the periodic counting value.

In step S4, a power control signal is outputted to the inverter of the microwave oven according to the frequency signal.

In step S5, the inverter of the microwave oven outputs a power to a magnetron of the microwave oven according to the power control signal. The magnetron works with the power outputted by the inverter.

In one embodiment, the index table comprises a plurality of identification numbers and a plurality of periodic counting values, there is a one-to-one relationship between the plurality of periodic counting values and the plurality of identification numbers, and the plurality of identification numbers form an arithmetic progression. Identification numbers corresponding to theoretic periodic counting values are ranged between a first identification number and a last identification number of the plurality of identification numbers.

It can be understood that the method can be realized by the system 100 described above, and thus a detail description of the method may refer to the embodiment of the system 100 described above, which will not described in detail herein.

With the method for adjusting the power of the inverter of the microwave oven, by looking up in the index table comprising periodic counting values and identification numbers to obtain the periodic counting value corresponding to the power request signal, and controlling the power outputted by the inverter according to the periodic counting value, a conventional coefficient weighted correction method is avoided. Moreover, the periodic counting value is looked up in the index table, such that the power outputted by the inverter fluctuates in a normal range, and the magnetron may work normally, thus ensuring a lifetime of the magnetron.

Figure 5:
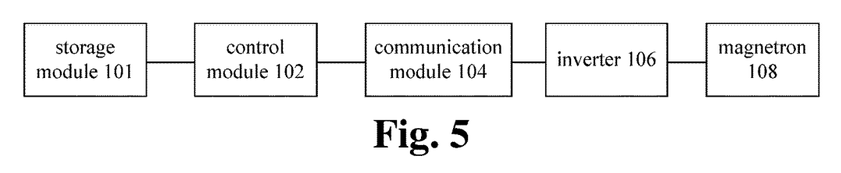
FIG. 5 is a block diagram of a microwave oven according to an embodiment of the present disclosure.

Referring to FIG. 5, a microwave oven is provided according to an embodiment of the present disclosure. The microwave oven includes: a storage module 101, a control module 102, a communication module 104, an inverter 106 and a magnetron 108, as shown in FIG. 5.

The storage module 101 is configured to store an index table comprising periodic counting values and identification numbers (referring to Table. 4).

The control module 102 is configured to look up an identification number corresponding to a power request signal in the index table according to the power request signal, to look up a periodic counting value corresponding to the identification number in the index table, and to output a frequency signal according to the periodic counting value.

The communication module 104 is configured to output a power control signal to the inverter of the microwave oven according to the frequency signal. The inverter of the microwave oven outputs a power to a magnetron of the microwave oven according to the power control signal. In this embodiment, with reference to FIG. 2, the communication module 104 may include a transistor Q1, a resistor R1, a resistor R2, a resistor R3 and a resistor R4.

The resistor R1 has one terminal connected with an input/output port of the communication module 102 and the other terminal connected with a base of the transistor Q1. The resistor R2 has one terminal connected with the other terminal of the resistor R1 and the base of the transistor Q1 and the other terminal connected with the emitter of the transistor Q1 and a DC power source (e.g., 5V). The transistor Q1 has an emitter connected with the DC power source and a collector connected with one terminal of the resistor R3. The other terminal of the resistor R3 is connected with a power source port of an inverter. The resistor R4 has one terminal connected with the other terminal of the resistor R3 and the power source port of the inverter and the other terminal grounded.

The transistor may be a PNP transistor. The resistor R1 may be a current limiting resistor, the resistor R2 may be a pull-up resistor, and the resistor R3 and the resistor R4 each may be a divider resistor. The transistor Q1, the resistor R1 and the resistor R2 may be replaced by a digital transistor Q2 shown in FIG. 3.

A function of the transistor Q1 may be illustrated as follows. The input/output port (i.e., IO port) of the communication module 102 is named as Frequency, representing a frequency F outputted by the communication module 102. The frequency F is outputted to the power source port (i.e., Power port) of the inverter through an isolation of the transistor Q1, representing the power P to be outputted by the inverter. A communicating regulation of the communication module 104 is that, if the control module 102 outputs 1 Hz frequency signal, it means that the inverter will output 1 W power. It should be understood that, in other embodiments, a relationship between the frequency signal and the power outputted may be adjusted according to practice or different requirements, which is not limited herein.

The inverter 106 is configured to output a power to the magnetron 108 according to the power control signal. The magnetron 108 is configured to work with the power outputted by the inverter 106.

In this embodiment, the control module 102 may be a computer board control chip, such as a pulse width modulation (PWM) control module. The PWM control module is configured to generate PWM wave forms with adjustable period and duty ratio. A principle of the PWM control module is dividing frequency for a reference oscillating source having a fixed frequency $F_{osc}$ to generate wave forms with adjustable frequencies. The oscillating source may be an RC oscillating circuit, a crystal oscillator or a ceramic resonator. Considering that an error of the RC resonance oscillation is relatively greater, which may cause a relatively greater power deviation, the crystal oscillator or the ceramic resonator is preferred.

In this embodiment, the storage module 101 stores the index table comprising periodic counting values and identification numbers, the control module 102 obtains the periodic counting value corresponding to the power request signal by looking up in the index table comprising periodic counting values and identification numbers, and controls the power outputted by the inverter according to the periodic counting value. By this means, the conventional coefficient weighted correction method is avoided. The index table may be established with reference to above example, which will not be described in detail herein. In one embodiment, the index table includes a plurality of identification numbers and a plurality of periodic counting values, there is a one-to-one relationship between the plurality of periodic counting values and the plurality of identification numbers, and the plurality of identification numbers form an arithmetic progression. Identification numbers corresponding to theoretic periodic counting values are ranged between a first identification number and a last identification number of the plurality of identification numbers.

With the microwave oven, the control module obtains the periodic counting value corresponding to the power request signal by looking up in the index table comprising periodic counting values and identification numbers, and controls the power outputted by the inverter according to the periodic counting value. By this means, a conventional coefficient weighted correction method is avoided, and the periodic counting value is looked up in the index table, such that the power outputted by the inverter fluctuates in a normal range, and the magnetron may work normally, thus ensuring a lifetime of the magnetron.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A system for adjusting a power of an inverter of a microwave oven, comprising:
   a control module, configured to look up, from an index table that includes periodic counting values and identification numbers, an identification number corresponding to a power request signal, to look up a periodic counting value corresponding to the identification number in the index table, and to output a frequency signal according to the periodic counting value, wherein the power request signal corresponds to a desired power magnitude selected by a power option element of the microwave oven, and wherein the periodic counting value controls a period of the frequency signal relative to a period of a reference oscillating source; and
   a communication module, configured to output a power control signal to the inverter of the microwave oven according to the frequency signal,
   wherein the inverter of the microwave oven outputs a power to a magnetron of the microwave oven according to the power control signal.

2. The system according to claim 1, wherein the control module is a PWM control module.

3. The system according to claim 2, wherein the communication module comprises:
a transistor, having an emitter connected with a DC power source;
a first resistor, having one terminal connected with an input/output port of the communication module and the other terminal connected with a base of the transistor;
a second resistor, having one terminal connected with the other terminal of the first resistor and the base of the transistor and the other terminal connected with the emitter of the transistor and the DC power source;
a third resistor, having one terminal connected with a collector of the transistor and the other terminal connected with a power source port of the invertor; and
a fourth resistor, having one terminal connected with the other terminal of the third resistor and the power source port of the inverter and the other terminal grounded.

4. The system according to claim 2, wherein there is a one-to-one relationship between the plurality of periodic counting values and the plurality of identification numbers, and the plurality of identification numbers form an arithmetic progression.

5. The system according to claim 1, wherein there is a one-to-one relationship between the plurality of periodic counting values and the plurality of identification numbers, and the plurality of identification numbers form an arithmetic progression.

6. The system according to claim 5, wherein identification numbers corresponding to theoretic periodic counting values are ranged between a first identification number and a last identification number of the plurality of identification numbers.

7. The system of according to claim 1, wherein the control module is further configured to adjust the identification number corresponding to the power request signal based upon a deviation between an actual output power and a theoretical output power in the microwave oven such that the control module uses the adjusted identification number to look up the periodic counting value and thereby compensate for the deviation.

8. A system for adjusting a power of an inverter of a microwave oven, comprising:
a control module, configured to look up, from an index table that includes periodic counting values and identification numbers, an identification number corresponding to a power request signal, to look up a periodic counting value corresponding to the identification number in the index table, and to output a frequency signal according to the periodic counting value; and
a communication module, configured to output a power control signal to the inverter of the microwave oven according to the frequency signal,
wherein the inverter of the microwave oven outputs a power to a magnetron of the microwave oven according to the power control signal, and wherein the communication module comprises:
a transistor, having an emitter connected with a DC power source;
a first resistor, having one terminal connected with an input/output port of the communication module and the other terminal connected with a base of the transistor;
a second resistor, having one terminal connected with the other terminal of the first resistor and the base of the transistor and the other terminal connected with the emitter of the transistor and the DC power source;
a third resistor, having one terminal connected with a collector of the transistor and the other terminal connected with a power source port of the invertor; and
a fourth resistor, having one terminal connected with the other terminal of the third resistor and the power source port of the inverter and the other terminal grounded.

9. The system according to claim 8, wherein the there is a one-to-one relationship between the plurality of periodic counting values and the plurality of identification numbers, and the plurality of identification numbers form an arithmetic progression.

10. The system of according to claim 8, wherein the control module is further configured to adjust the identification number corresponding to the power request signal based upon a deviation between an actual output power and a theoretical output power in the microwave oven such that the control module uses the adjusted identification number to look up the periodic counting value and thereby compensate for the deviation.

11. A microwave oven, comprising:
a control module, configured to look up, from an index table that includes periodic counting values and identification numbers, an identification number corresponding to a power request signal, to look up a periodic counting value corresponding to the identification number in the index table, and to output a frequency signal according to the periodic counting value, wherein the power request signal corresponds to a desired power magnitude selected by a power option element of the microwave oven, and wherein the periodic counting value controls a period of the frequency signal relative to a period of a reference oscillating source; and
a communication module, configured to output a power control signal according to the frequency signal;
an inverter, configured to output a power to a magnetron according to the power control signal; and
the magnetron, configured to work with the power outputted by the inverter.

12. The microwave oven according to claim 11, wherein the control module is a PWM control module.

13. The microwave oven according to claim 12, wherein the communication module comprises:
a transistor, having an emitter connected with a DC power source;
a first resistor, having one terminal connected with an input/output port of the communication module and the other terminal connected with a base of the transistor;
a second resistor, having one terminal connected with the other terminal of the first resistor and the base of the transistor and the other terminal connected with the emitter of the transistor and the DC power source;
a third resistor, having one terminal connected with a collector of the transistor and the other terminal connected with a power source port of the invertor; and
a fourth resistor, having one terminal connected with the other terminal of the third resistor and the power source port of the inverter and the other terminal grounded.

14. The microwave oven according to claim 12, wherein there is a one-to-one relationship between the plurality of periodic counting values and the plurality of identification numbers, and the plurality of identification numbers form an arithmetic progression.

15. The microwave oven according to claim 11, wherein the communication module comprises:
a transistor, having an emitter connected with a DC power source;

a first resistor, having one terminal connected with an input/output port of the communication module and the other terminal connected with a base of the transistor;

a second resistor, having one terminal connected with the other terminal of the first resistor and the base of the transistor and the other terminal connected with the emitter of the transistor and the DC power source;

a third resistor, having one terminal connected with a collector of the transistor and the other terminal connected with a power source port of the invertor; and a fourth resistor, having one terminal connected with the other terminal of the third resistor and the power source port of the inverter and the other terminal grounded.

16. The microwave oven according to claim 15, wherein there is a one-to-one relationship between the plurality of periodic counting values and the plurality of identification numbers, and the plurality of identification numbers form an arithmetic progression.

17. The microwave oven according to claim 11, wherein there is a one-to-one relationship between the plurality of periodic counting values and the plurality of identification numbers, and the plurality of identification numbers form an arithmetic progression.

18. The microwave oven according to claim 17, wherein identification numbers corresponding to theoretic periodic counting values are ranged between a first identification number and a last identification number of the plurality of identification numbers.

19. The microwave oven according to claim 11, wherein the control module is further configured to adjust the identification number corresponding to the power request signal based upon a deviation between an actual output power and a theoretical output power in the microwave oven such that the control module uses the adjusted identification number to look up the periodic counting value and thereby compensate for the deviation.

* * * * *

UNITED STATES PATENT AND TRADEMARK OFFICE
CERTIFICATE OF CORRECTION

PATENT NO. : 10,492,248 B2
APPLICATION NO. : 14/972910
DATED : November 26, 2019
INVENTOR(S) : Yue-Yue Lin It is certified that error appears in the above-identified patent and that said Letters Patent is hereby corrected as shown below:

On the Title Page

Attorney, Agent, or Firm: "Middle Reutlinger" should be "Middleton Reutlinger"

Signed and Sealed this
Twenty-first Day of January, 2020

Andrei Iancu
*Director of the United States Patent and Trademark Office*